US009897445B2

(12) United States Patent
Bar Hillel et al.

(10) Patent No.: US 9,897,445 B2
(45) Date of Patent: Feb. 20, 2018

(54) TARGET DIRECTION DETERMINATION METHOD AND SYSTEM

(71) Applicant: ISRAEL AEROSPACE INDUSTRIES LTD., Lod (IL)

(72) Inventors: Gil Bar Hillel, Tel-Aviv (IL); Garry Haim Zalmanson, Raanana (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 162 days.

(21) Appl. No.: 15/021,055

(22) PCT Filed: Sep. 14, 2014

(86) PCT No.: PCT/IL2014/050819
§ 371 (c)(1),
(2) Date: Mar. 10, 2016

(87) PCT Pub. No.: WO2015/049675
PCT Pub. Date: Apr. 9, 2015

(65) Prior Publication Data
US 2016/0223326 A1    Aug. 4, 2016

(30) Foreign Application Priority Data

Oct. 6, 2013  (IL) .......................................... 228735

(51) Int. Cl.
| H04N 7/00 | (2011.01) |
| G01C 11/02 | (2006.01) |
| G01C 1/04 | (2006.01) |
| G01B 11/00 | (2006.01) |
| G01C 5/00 | (2006.01) |

(Continued)

(52) U.S. Cl.
CPC ............ *G01C 11/02* (2013.01); *G01B 11/002* (2013.01); *G01C 1/04* (2013.01); *G01C 5/00* (2013.01); *G06T 7/74* (2017.01); *G06T 7/80* (2017.01); *H04N 5/23238* (2013.01); *H04N 5/23296* (2013.01); *G06T 2207/30244* (2013.01)

(58) Field of Classification Search
CPC ........... G06T 7/80; G06T 7/74; G01B 11/002; G01C 1/04; G01C 5/00; H04N 5/23238; H04N 5/23296
USPC ..................................................... 348/36, 143
See application file for complete search history.

(56) References Cited

U.S. PATENT DOCUMENTS 4,866,626 A * 9/1989 Egli ..................... G01C 21/005
340/947
5,471,218 A   11/1995 Talbot et al.
(Continued)

FOREIGN PATENT DOCUMENTS

EP            1503176 A2    2/2005

*Primary Examiner* — Helen Shibru
(74) *Attorney, Agent, or Firm* — Oliff PLC

(57) ABSTRACT

A method of determining a direction of a target in a ground referential, the method including: acquiring an image of a scene including the target and a control object using a camera; obtaining position data of the camera and control object using a geo-spatial positioning system; determining a control direction from the camera to the control object in the ground referential using the position data; estimating a camera attitude in the ground referential using the control direction; determining the target direction from the camera to the target using the estimated camera attitude and a pixel position of the target in the image.

15 Claims, 5 Drawing Sheets

(51) Int. Cl.
*H04N 5/232* (2006.01)
*G06T 7/80* (2017.01)
*G06T 7/73* (2017.01)

(56) References Cited

U.S. PATENT DOCUMENTS

| | | | |
|---|---|---|---|
| 6,035,254 A | 3/2000 | Nichols | |
| 7,623,224 B2 | 11/2009 | Vogel | |
| 9,564,175 B2* | 2/2017 | Acharya | G11B 27/10 |
| 9,679,382 B2* | 6/2017 | Zalmanson | G06T 7/337 |
| 2001/0010542 A1* | 8/2001 | Takagi | G01S 3/7864 |
| | | | 348/152 |
| 2003/0179361 A1 | 9/2003 | Ohtomo et al. | |
| 2004/0246468 A1 | 12/2004 | Ohtomo et al. | |
| 2009/0125223 A1* | 5/2009 | Higgins | G06T 7/246 |
| | | | 701/532 |
| 2009/0222237 A1 | 9/2009 | Otani et al. | |
| 2011/0007154 A1 | 1/2011 | Vogel et al. | |
| 2012/0063668 A1* | 3/2012 | Zalmanson | G01C 11/04 |
| | | | 382/154 |
| 2012/0173053 A1 | 7/2012 | Ohtomo et al. | |
| 2015/0126223 A1* | 5/2015 | Lee | G01S 5/0009 |
| | | | 455/456.3 |

* cited by examiner

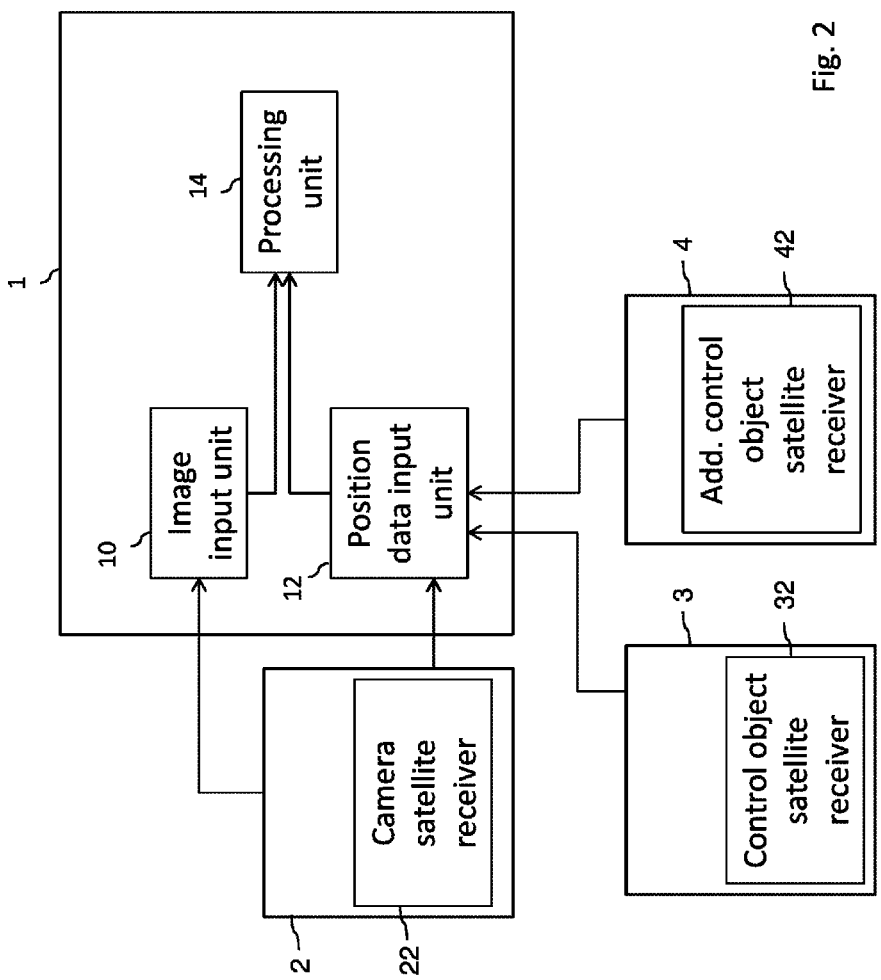

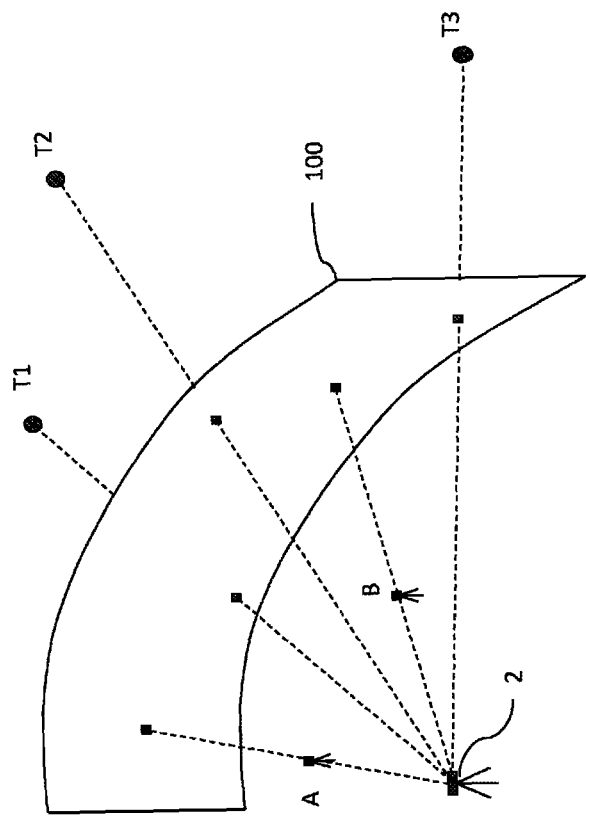

TARGET DIRECTION DETERMINATION METHOD AND SYSTEM

TECHNOLOGICAL FIELD

The present disclosure relates in general to surveying methods. More particularly, the present disclosure relates to a system and method for determining a direction from a camera to a target in a ground referential.

BACKGROUND

Target geolocation refers generally to the problem of determining the coordinates of a target in a predefined referential (reference frame) such as the World Geodetic System (WGS84). Surveyors generally use theodolites for target geolocation. In operation, the surveyor places the theodolite at a reference position and points the theodolites at the target by visually locating the target through an optical system. Thereafter, the surveyor measures an angle between the target and a reference direction as well as a distance between the target and the theodolite. Typically, the reference direction and position of the theodolite are preliminarily determined by the theodolite observing a set of points, the locations of which are accurately known within the predefined referential. Using, the coordinates of the locations, the reference direction of the theodolite in the predefined referential can be determined with a predetermined level of accuracy. The general process for target geolocation comprises therefore two main stages: a set-up stage in which the reference position and direction of the theodolite is determined and a measurement stage in which the relative angle between the reference direction and the target direction and the distance between the reference position and the target position are measured.

GENERAL DESCRIPTION

Theodolites need to incorporate sophisticated mechanical components to allow accurate angular measurements and further require a setup stage which make them difficult to use in a stand alone environment where a set of accurately known points is not available. In certain situations, it is preferable to have an autonomous instrument and not to rely on mechanical components while maintaining a satisfactory accuracy.

The Applicant has found that the use of a camera combined with satellite positioning technologies for georeferencing the camera provides a simple system without the need for sophisticated mechanical components while maintaining a satisfactory accuracy and improving possibilities of use in stand alone environments.

It is noted that target location accuracy is dependent on several factors among which are self location accuracy of the instrument, angular measurement accuracy from a reference direction to the target direction and range measurement accuracy from the instrument to the target. However, a significant factor influencing accuracy is angular accuracy because this is dependent on the range of the target, and the other factors mentioned above generally cause only bias deviation.

Further, angular accuracy generally comprises both accuracy of a referencing of the instrument, for example determination of a Line Of Sight (LOS) to the north and leveling, and accuracy of the target direction, for example the angle measurement to the target relative to LOS to the north.

The accuracy of measuring relative angles using mechanical theodolites (employing high quality gears) is generally of about a few tens of micro radians (around 25 micro-radians). The total accuracy is also dependent on the accuracy of the absolute direction finding ("north-finding"). Standard (non-theodolite) high-end mechanical pan tilt units (PTU) have an accuracy of a few hundred micro-radians for measuring relative angles, but still require a gear. When adding the accuracy of the north finding using "simple" systems (e.g., compass), typical total accuracies of such PTU units are in the area of 500-5000 micro-radians. In the following, a satisfactory total accuracy is understood as a total accuracy from tens to several hundreds of micro-radians, for example 200 or 500 micro-radians. The proposed method and system notably allow reaching such a satisfactory accuracy without requiring a gear.

It is further noted that, although satellite positioning accuracy such as GPS (especially when using single frequency receivers as suggested below) is in the range of meters, a relative measurement between two close points is accurate to the centimeter level. The below statement is especially valid when analyzing the carrier phase of the GPS signal. Indeed, most of the errors in GPS positioning are common errors (including the ionosphere) which cause a bias but keep the relative direction accurate. Furthermore, error accuracy is not dependent on the actual distance between the GPS receivers, especially when the distance is in the range of hundreds of meters. When apprehended from the point of view of direction accuracy, one centimeter accuracy for example at one hundred meter distance turns into 100 micro-radians accuracy. Therefore, it is expected that determining a reference attitude of an instrument based on GPS receiver(s) positioned at hundred(s) of meters of the instrument can be done in the order of 50 to 500 micro-radians.

Furthermore, a calibrated camera may generally provide angle measurement with internal accuracy (meaning a measurement of an angle between two pixels) at single digit magnitude of micro-radians and, furthermore, when enlarging the field of view with a panorama by mosaicing techniques, the accuracy of tens of micro-radians may be expected.

Therefore, the present disclosure provides a method of determining a direction of a target in a ground referential, the method comprising: acquiring an image of a scene including the target and a control object using a camera; obtaining position data of the camera and control object using a geo-spatial positioning system; determining a control direction from the camera to the control object in the ground referential using said position data; estimating a camera attitude in the ground referential using the control direction; determining the target direction from the camera to the target using the estimated camera attitude and a pixel position of the target in the image.

In some embodiments, the method further comprises leveling of the camera using a level instrument and wherein estimating the camera attitude is performed using the leveling of the camera.

In some embodiments, the image further includes at least one additional control object, and the method further comprises: obtaining additional position data regarding the at least one additional control object using the geo-spatial positioning system; determining at least one additional control direction from the camera to the at least one additional control object in the ground referential using said additional position data. The step of estimating the camera attitude is performed using the at least one additional control direction.

In some embodiments, estimating the camera attitude using the at least one additional control direction comprises refining the estimated camera attitude using the at least one additional control direction by: estimating the at least one additional control direction based on the estimated camera attitude and on a pixel position of the additional control object on the image; comparing the at least one estimated additional control direction to the at least one additional control direction determined based on the additional position data to obtain a direction disagreement vector; computing a correction rotation matrix to minimize the direction disagreement vector.

In some embodiments, estimating the camera attitude using the at least one additional control direction comprises solving the equations provided by the camera model at the two control objects.

In some embodiments, the step of acquiring the image comprises: capturing a plurality of overlapping elementary images by modifying an orientation of the camera so as to scan a predetermined area of the scene, and forming a panoramic image by mosaicing of the elementary images.

In some embodiments, the control object and the target belong to different elementary images.

In some embodiments, the at least one additional control object and the control object belong to different elementary images.

In some embodiments, the ground referential is a East, North, Up referential centered on the camera position.

In some embodiments, the geo-spatial positioning system is a Global Navigation Satellite System (GNSS).

In some embodiments, the position data are provided without using differential correction and/or without using real time kinematic procedures.

In another aspect, the present disclosure provides a surveying module for determining a direction of a target in a ground referential. The surveying module comprises an image input unit configured for receiving an image of a scene including the target and a control object, the image being acquired using a camera; a position data input unit configured for receiving position data of the camera and of the control object from a geo-spatial positioning system; and a target direction processing unit configured for: determining a control direction from the camera to the control object in the ground referential using said position data; estimating a camera attitude in the ground referential based on the control direction; and determining the target direction from the camera to the target using the estimated camera attitude and a pixel position of the target in the image.

In some embodiments, the target direction processing unit is further configured for, when the image received by the image input unit further includes at least one additional control object and the position data received by the position data input unit further includes additional position data of the at least one additional control object: determining at least one additional control direction from the camera to the at least one additional control object in the ground referential using said additional position data; and wherein estimating the camera attitude is performed using the at least one additional control direction.

According to another aspect, the present disclosure provides a surveying system comprising a camera including a geo-spatial position receiver configured for receiving position signals from a geo-spatial positioning system and a geo-spatial position processor for determining camera position data from said position signals; and a surveying module as previously described.

In some embodiments, the surveying system further comprises a control object including a geo-spatial position receiver configured for receiving position signals of the control object from the geo-spatial positioning system and a communication unit configured for transferring said position signals to the geo-spatial position processor, the geo-spatial position processor being further configured for determining position data of the control object from said control object position signals.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2 illustrates a surveying system according to embodiments of the present disclosure.

FIG. 4 illustrates a camera and a panoramic image of a scene including a control object and an additional control object as well several targets according to some embodiments of the present disclosure.

DETAILED DESCRIPTION OF EMBODIMENTS

Figure 1B:
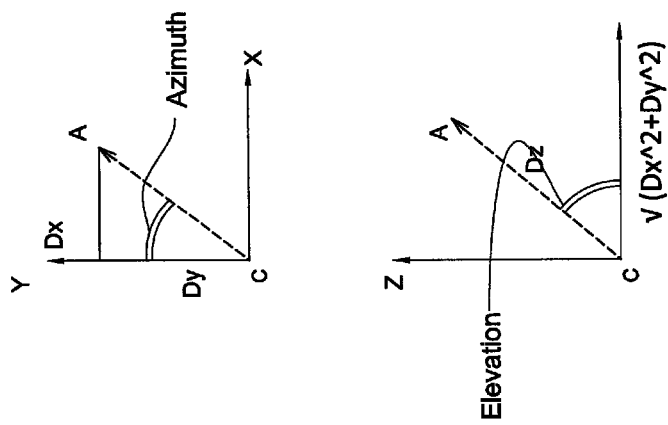
FIGS. 1A-1C illustrate certain notions useful in the present disclosure.

Described herein are some examples of systems and methods useful for determining a direction of a target in a ground referential.

In the following detailed description, numerous specific details are set forth in order to provide a thorough understanding of the subject matter. However, it will be understood by those skilled in the art that some examples of the subject matter may be practiced without these specific details. In other instances, well-known methods, procedures and components have not been described in detail so as not to obscure the description.

As used herein, the phrase "for example," "such as", "for instance" and variants thereof describe non-limiting examples of the subject matter.

Reference in the specification to "one example", "some examples", "another example", "other examples, "one instance", "some instances", "another instance", "other instances", "one case", "some cases", "another case", "other cases" or variants thereof means that a particular described feature, structure or characteristic is included in at least one example of the subject matter, but the appearance of the same term does not necessarily refer to the same example.

It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

Unless specifically stated otherwise, as apparent from the following discussions, it is appreciated that throughout the specification discussions utilizing terms such as "generating", "determining", "providing", "receiving", "using", "transmitting", "performing", "forming", "analyzing", or the like, may refer to the action(s) and/or process(es) of any combination of software, hardware and/or firmware.

For example, these terms may refer in some cases to the action(s) and/or process(es) of a programmable machine, that manipulates and/or transforms data represented as physical, such as electronic quantities, within the programmable machine's registers and/or memories into other data similarly represented as physical quantities within the programmable machine's memories, registers and/or other such information storage, transmission and/or display element(s).

Further, it should be understood that the term "position data" may encompass positioning information provided by any geo-spatial positioning system using for example radio frequency signals transmitted from a network of transmitters (i.e. GNSS or other systems which allow the user to determine its location such that an accuracy error between two close points measurements is mainly bias). In the below description, the term satellite position data is used without prejudice to alternative embodiments such as beacon signals or the like.

Furthermore, it is noted that the term camera is used hereby to generally refer to an imaging device comprising a pixel matrix sensor.

Figure 1A:
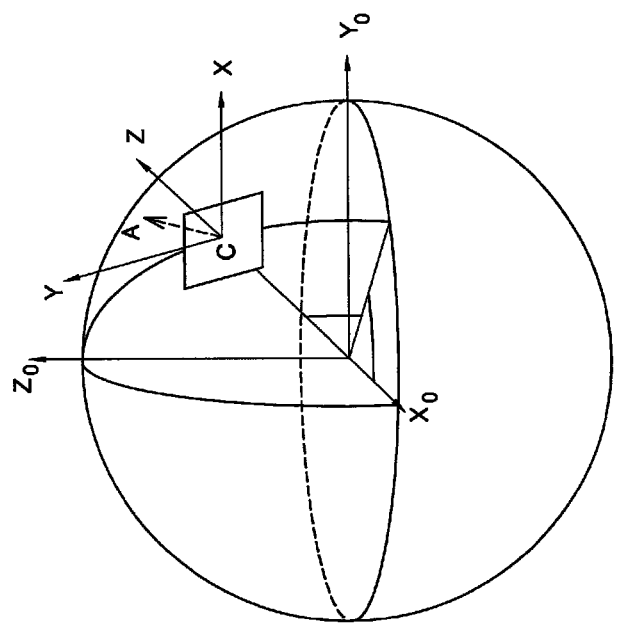
Figure 1C:
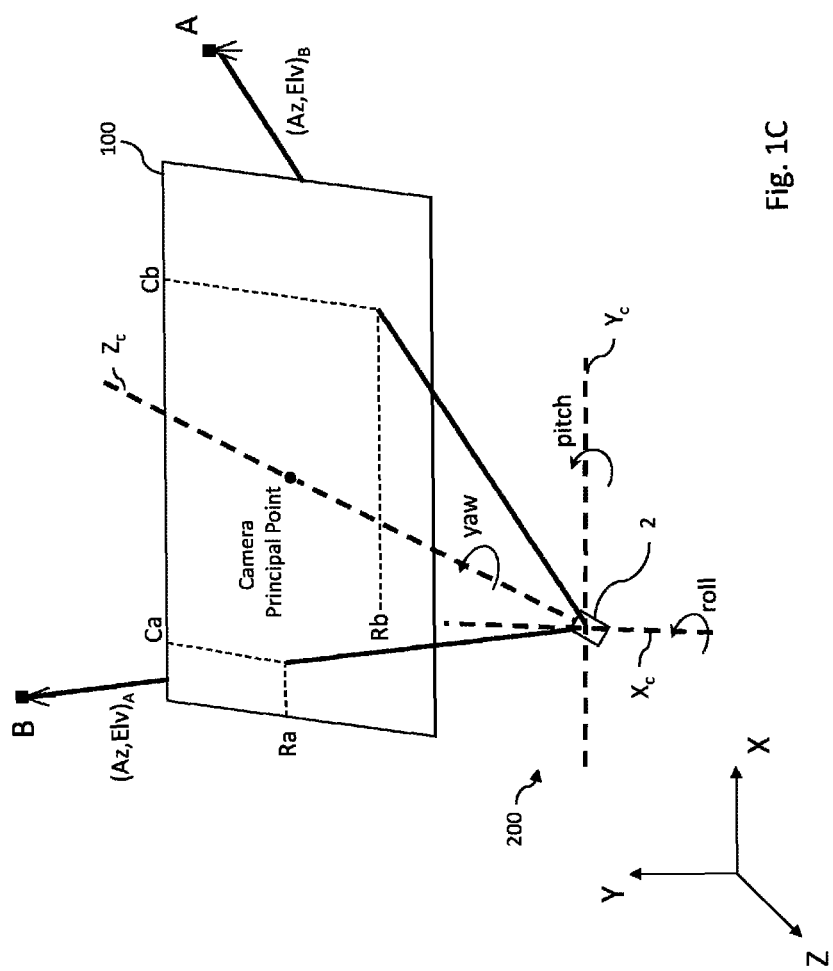

FIGS. 1A-1C illustrate generally notations useful for the description of the present disclosure. Generally, the present disclosure relates to a method of determining a direction of a target in a ground referential based on an image of the target acquired by a camera and on position data of the camera and of at least one control object present in the image. It is noted that the position data may be provided in a geodesic referential—such as WGS84 or NAD83—by a satellite positioning system such as a Global Navigation Satellite System (GNSS). With reference to FIG. 1A, such a geodesic referential is noted $(X_0, Y_0, Z_0)$. The ground referential in which the direction of the target is determined may be a East/North/Up referential centered on the camera C position and noted (X, Y, Z) on FIG. 1A. It is noted that conversion from the $(X_0, Y_0, Z_0)$ coordinates to the (X, V, Z) coordinates is well known for the man skilled in the art and is not described herein for the sake of conciseness. Further, as represented on FIG. 1B, a direction towards an object A in (X, Y, Z) may be defined by an Azimuth and Elevation of the object A also noted in the following $(Az, Elv)_A$. According to embodiments of the present disclosure, GNSS data (which may include code and phase observations of at least one RF frequency channel) of the camera C and of a control object A may be obtained and used to determine a relative vector CA=(Dx, Dy, Dz) in the (X, Y, Z) referential and thereby provide the Azimuth and Elevation of A (also referred to as the control object direction) as follows:

$$\text{Azimuth} = \tan^{-1}\frac{D_x}{D_y}$$

$$\text{Elevation} = \tan^{-1}\frac{D_z}{\sqrt{D_x^2 + D_y^2}}$$

Further, with reference to FIG. 1C, a digital camera 2 may acquire an image 100 on which two control objects A and B appear. The camera 2 may include a pixel matrix sensor and the pixel positions on the image 100 may be referred to using two coordinates indicating the column and row of a given pixel. The pixel positions of the control objects A, B may be referred to in the following as $(C_A, R_A)$ and $(C_B, R_B)$. The camera 2 may be provided with a camera referential $(X_c, Y_c, Z_c)$ (also referenced 200) centered on the optical center of the camera 2. The origin of the camera referential may be defined at the camera perspective center located at a focal distance before the focal plane, the Zc axis may be aligned with an optical axis and pointing outward, the plane formed by the axis $X_c$, $Y_c$ may be parallel to a focal plane with the $X_c$ axis pointing along image columns and the $Y_c$ axis completing a right-hand system (for rectangular arrays thereby pointing along image rows). An attitude of the camera 2 may be defined with reference to the (X, Y, Z) referential previously described to represent an orientation of the camera 2. As illustrated on FIG. 1C, the attitude can be defined as a rotation which brings the camera referential 200 (coordinate system) into conformity with the (X, Y, Z) ground referential. For example, the attitude may be represented by Euler angles i.e. yaw, pitch and roll around the axis of the camera coordinate system. As will be explained in more detail below, the Euler angles can be computed from the position data of two control objects A, B by determining the directions $(Az, Elv)_A$ and $(Az, Elv)_B$ from the camera to the control objects in the ground referential and using a camera model for referencing the orientation of the camera. The camera principal point illustrated on FIG. 1C may refer to the point on the focal plane formed by an orthogonal projection of the camera center onto the focal plane.

Parameters of the camera model may be preliminary known (or solved during the process). In the following, details are provided for a given camera model. It is understood that the present disclosure can be extended to other types of camera models.

The considered camera model provides a relation between an object X and an image of the object X as follows:

$$\begin{bmatrix} \cos(Elv_X)\sin(Az_X) \\ \cos(Elv_X)\cos(Az_X) \\ \sin(Az_X) \end{bmatrix} \sim R(\text{roll, pitch, yaw}) * K^{-1} \begin{bmatrix} C_X \\ R_X \\ 1 \end{bmatrix}$$

Wherein:
$C_X$ is a pixel column location of an image of the object X;
$R_X$ is a pixel row location of the image of the object X;
K is a camera calibration matrix, as detailed hereinbelow:
R (roll, pitch, yaw) is the rotation matrix between the reference coordinate system and the camera coordinate system as defined with reference to FIG. 1C;
$El_X$, $Az_X$ are the Elevation and Azimuth of object X as previously defined with reference to FIG. 1B.

The camera calibration matrix K may be expressed as follows:

$$K = \begin{bmatrix} f_c & s & c_0 \\ 0 & f_r & r_0 \\ 0 & 0 & 1 \end{bmatrix}$$

Wherein:
$f_c$ is a focal of the camera along the column axis;
$f_r$ is a focal of the camera along the row axis;
s is a skewness of the camera;
$c_0$ is a column coordinate of the focal center in the image coordinate system;
$r_0$ is row coordinate of the focal center in the image coordinate system.
K is also referred to as internal parameter or internal orientation of an image.

Referring now to FIG. 2, in some embodiments of the present disclosure, a surveying system may comprise a surveying module 1, a camera 2, a control object 3 and optionally an additional control object 4. The camera 2, the control object 3 and the additional control object 4 may respectively comprise a camera satellite receiver 22, a control object satellite receiver 32 and an additional control object satellite receiver 42.

The satellite receivers 22, 32, 42 of the camera 2, control object 3 and additional control object 4 may be respectively configured for receiving from a satellite positioning system, such as a GNSS, positioning signals enabling to determine position data of the camera 2, the control object 3 and the additional control object 4 in a ground referential such as WGS84. The camera 2, the control object 3 and the additional control object 4 may transfer to the surveying module 1 the positioning signals enabling to determine their respective position data or may transfer the respective position data directly. It is appreciated that the position data may be determined without using long-baseline differential correction techniques, without using real time kinematic procedures and without using double frequency receivers.

The satellite receiver 22 of the camera 2 may be mounted on the camera 2 and calibrated so that an antenna center of the satellite receiver 22 is calibrated with an optical center of the camera 2. The camera 2 may be mounted on tripod units configured for positioning the camera at a predetermined position. The control object 3 and/or the additional control object 4 may also be mounted on tripod units. The tripod unit may include a level instrument, such as a spirit level or a bubble level, configured for leveling the camera i.e. orienting the camera in a plane parallel to the XCY plane in the (X, Y, Z) referential defined on FIG. 1A. It is noted that when the camera 2 is provided with an accurate leveling instrument, the additional control object 4 may not be required. Indeed, as will be explained hereinafter, a control object with a known Elevation and Azimuth provides two equations from the camera model and therefore enables to determine two Euler angles of the camera attitude. Therefore, if the camera is oriented in a predefined plane, the determination of two Euler angles provides sufficient data to completely determine the attitude of the camera. Indeed, when the camera is leveled to the ground there is no need to solve the yaw angle (i.e. an angle about the optical axis causing the columns vector Xc not to be leveled) The tripod unit may enable to rotate around three perpendicular axes intersecting at the optical center of the camera (the rotation axes alternatively not be on the optical center—in which case the position of the rotation axes may be preliminarily determined/calibrated). The camera may comprise a pixel matrix sensor and an optical system configured for forming images of objects on the pixel matrix sensor.

The surveying module 1 may comprise an image input unit 10, a position data input unit 12 and a target direction processing unit 14. The image input unit 12 may be configured for receiving an image from the camera 2. The image may be a digital image and may include an image of a target, the control object 3 and optionally the additional control object 4. The position data input unit 12 may be configured for receiving position data from the camera 2, the control object 3 and the additional control object 4. In some embodiments, the position data is not computed internally by respectively the camera 2, the control object 3 and the additional control object 4. In these embodiments, the satellite positioning signals from the camera 2, the control object 3 and the additional control object 4 may be transferred to the surveying module 1 and the position data input unit 12 may be configured for computing the position data from the positioning signals. The target direction processing unit 14 may be configured to determine a direction (azimuth and elevation) of a target appearing in the image according to the method described in more details with reference to FIG. 3. An output device (not shown) may be configured for outputting the target direction as computed by the target direction processing device 14. For example the output device may comprise a display screen. In some embodiments, the output device may be the camera 2 and the computed target direction may be displayed on a display screen of the camera 2.

Figure 3:
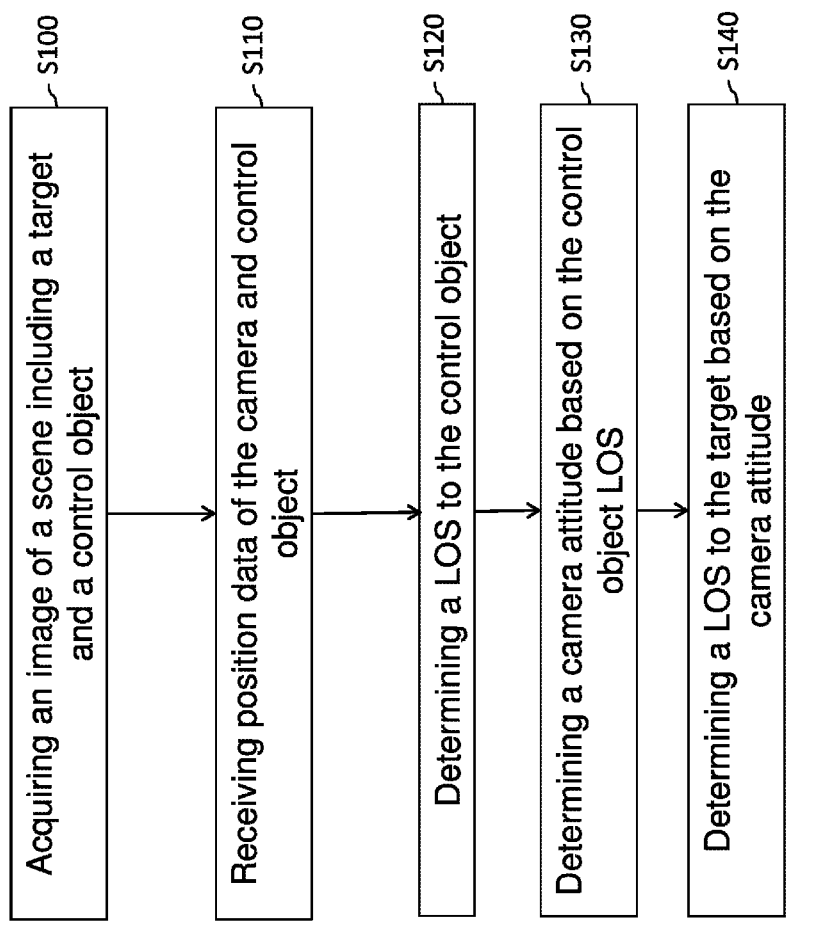
FIG. 3 illustrates a method of determining a target direction according to embodiments of the present disclosure.

FIG. 3 illustrates steps of a method of determining a target direction in a ground referential according to embodiments of the present disclosure. In a first step S100, an image of a scene including a target T and a control object A is acquired using a camera. Optionally, an additional control object (or several additional control objects) may be in the acquired scene. The step S100 of acquiring an image may optionally comprise the steps of: capturing a plurality of overlapping elementary images by controllably modifying an orientation (attitude) of the camera so as to scan a predetermined area of the scene and of forming a panoramic image by mosaicing of the elementary images. The modification of the orientation of the camera may be performed by moving the camera using a tripod. In some embodiments, the control object, the target and the additional control object may belong to different elementary images. In a second step S110, position data of the camera and of the control object (and optionally of the additional control object) may be retrieved from a satellite positioning system. In some embodiments, the camera and control object may be configured to receive positioning signals from the satellite positioning system and may either extract the position data from the positioning signals and transmit the position data to a surveying module implementing the method or transmit directly the positioning signals to the surveying module which may therefore be configured to extract position data from the positioning signals. It is appreciated that the architecture may also comprise other intermediate elements. It is also noted that the position data may be determined without using differential correction techniques, without using real time kinematic procedures and without using double frequency receivers. It is noted that the position data may be originally obtained in a first geodesic referential such as WGS84. In a third step S120, a control direction (also referred to as Line Of Sight or LOS) from the camera to the control object may be computed in the ground referential (X, Y, Z) as defined with reference to FIG. 1A. The control direction may be computed by determining the coordinates of a relative vector in the first geodesic referential and by converting said coordinates into coordinates in the ENU referential. The relative vector is illustrated on FIG. 1A by $CA=(D_x, D_y, D_z)$. FIG. 1B illustrates how the control direction $(Ely, Az)_A$ can be obtained from the relative vector CA. It is noted that even though the position data from the satellite positioning system may have an accuracy in the range of a few meters, the coordinates of the relative vector CA have an accuracy in the range of a few millimeters to a few centimeters It is to be noted that the accuracy can even be improved by for example using two GNSS frequencies, etc. In a fourth step S130, an estimation of the camera attitude in the ground referential may be performed based on the control direction, on the camera model and on the pixel position of the control object in the image. In the fourth step S130, two Euler angles of the camera attitude can be estimated by speculating about the value of the third Euler angle. For example, the third Euler angle (yaw) may be considered equal to zero. The equations provided by the camera model expressed on the control object are:

$$\begin{bmatrix} \cos(Elv_A)\sin(Az_A) \\ \cos(Elv_A)\cos(Az_A) \\ \sin(Az_A) \end{bmatrix} \sim R(roll, pitch, 0) * K^{-1} \begin{bmatrix} C_A \\ R_A \\ 1 \end{bmatrix}$$

These equations enable to compute a pitch and roll values and therefore provide an estimation of the camera attitude. It is noted that when the image is a panorama, a global rotation matrix may be obtained by multiplying the above rotation matrix by a rotation matrix representing the controlled modification of the camera orientation that created the panorama. In some embodiments, the rotation matrix from the camera attitude acquiring one image to the camera attitude acquiring another image can be determined using image processing, for example by determining tie points common in two adjacent images to obtain the transformations between two images.

In a fifth step S140, the target direction from the camera to the target T may be computed using the camera model, the camera attitude and a pixel position of the target in the image by inverting the system provided by the camera model:

$$\begin{bmatrix} \cos(Elv_T)\sin(Az_T) \\ \cos(Elv_T)\cos(Az_T) \\ \sin(Az_T) \end{bmatrix} \sim R(roll, pitch, 0) * K^{-1} \begin{bmatrix} C_T \\ R_T \\ 1 \end{bmatrix}$$

In some embodiments, the image may also include an additional control object and the method may further comprise the steps of receiving additional position data regarding the at least one additional control object using the satellite positioning system; determining at least one additional control direction from the camera to the at least one additional control object in the ground referential using said additional position data; refining the camera attitude using the at least one additional control direction; and refining the target direction from the camera to the target using the refined camera attitude. The refining of the camera attitude may comprise the steps of: estimating the at least one additional control direction based on the estimated camera attitude and on a pixel position of the additional control object on the image; comparing the estimated at least one additional control direction to the at least one additional control direction determined based on the additional position data to obtain a direction disagreement vector; and computing a correction rotation matrix to minimize the direction disagreement vector.

With an additional control object B it may also be possible to determine the camera attitude directly from the equations provided by the camera model at the two control objects without speculating on the value of one of the Euler angles:

$$\begin{bmatrix} \cos(Elv_A)\sin(Az_A) \\ \cos(Elv_A)\cos(Az_A) \\ \sin(Az_A) \end{bmatrix} \sim R(roll, pitch, yaw) * K^{-1} \begin{bmatrix} C_A \\ R_A \\ 1 \end{bmatrix}$$

$$\begin{bmatrix} \cos(Elv_B)\sin(Az_B) \\ \cos(Elv_B)\cos(Az_B) \\ \sin(Az_B) \end{bmatrix} \sim R(roll, pitch, yaw) * K^{-1} \begin{bmatrix} C_B \\ R_B \\ 1 \end{bmatrix}$$

Indeed, the camera model thereby provides four equations for solving three parameters which can therefore be determined. It is noted that more control objects may be useful to improve the accuracy by for example trying to correct certain deficiencies in the camera model parameters. For example, it may enable to solve optical aberrations (s, $c_0$, $r_0$) of the camera model.

In the case the camera is provided with a level instrument, the yaw and pitch of the camera can be determined without calculation.

FIG. 4 illustrates an exemplary embodiment in which the previously described method may be used to acquire a panorama 100 including two control objects A, B and three targets $T_1$, $T_2$, $T_3$. As illustrated, an advantage of the method may be that the targets can be at a further distance than the control objects. For example, the control objects can be at a hundred meters from the camera and the targets may be at several kilometers. Furthermore, as illustrated, the target and the control objects may be widespread (not in the FOV of one image) in the field of view of the camera because the panorama enables to increase the area seen by the camera. The method is hereinbelow repeated using different words for trying to clarify certain aspects. The method may comprise installing a GPS receiver on the camera and calibrating between the antenna center of the receiver and the optical center of the camera. The method may further comprise installing the camera on a tripod and setting up a second receiver near by (for example tens of meters) and acquiring a first picture of the second receiver. The method may comprise setting up a third receiver and acquiring a second picture of the third receiver. The first and second picture may overlap. A rotation matrix between the camera attitude acquiring the first picture and the camera attitude acquiring the second picture may be determined by image processing. Thereafter, using the GPS measurement from the three receivers, a line of sight (direction) from the camera to the second receiver and a line of sight from the camera to the third receiver may be determined and an absolute line of sight of the panorama can be computed. The panorama may further be enlarged to include targets which would not be already present in the image. The targets may be kilometers away from the camera. The pixel location of the target in the panorama may be determined and using the line of sight of the panorama and the pixel location of the target, the line of sight of the target may be computed.

Advantageously, it is noted that no GPS base stations are required for implementing the described method. Therefore, assuming that GPS (more generally GNSS) is available, the described method is autonomous. The method provides an absolute line of sight determination of targets and has an accuracy in the range from tens to 500 micro-radians (depending on the equipment) using simple tools (tripod, camera, single frequency GPS receiver) with no sophisticated mechanical components. It is possible to get even better accuracies. For example when the distance between the GNSS receivers is increased and/or when the camera has a large amount of pixels etc.) The set up of the camera can be done using measurement(s) within a hundred meters from the camera.

Advantageously, after set-up, the camera can be handheld if dealing with remote targets because the angular change would be negligible.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A method of determining a direction of a target in a ground referential, the method comprising:
    acquiring an image of a scene including the target and a control object using a camera;
    obtaining position data of the camera and control object using a geo-spatial positioning system;
    determining a control direction from the camera to the control object in the ground referential using said position data;
    estimating a camera attitude in the ground referential using the control direction;
    determining the target direction from the camera to the target using the estimated camera attitude and a pixel position of the target in the image.

2. The method according to claim 1, further comprising leveling of the camera using a level instrument and wherein estimating the camera attitude is performed using the leveling of the camera.

3. The method according to claim 1, wherein the image further includes at least one additional control object, the method further comprises:
    obtaining additional position data regarding the at least one additional control object using the geo-spatial positioning system;
    determining at least one additional control direction from the camera to the at least one additional control object in the ground referential using said additional position data;
    and wherein estimating the camera attitude is performed using the at least one additional control direction.

4. The method according to claim 3, wherein estimating the camera attitude using the at least one additional control direction comprises refining the estimated camera attitude using the at least one additional control direction by:
    estimating the at least one additional control direction based on the estimated camera attitude and on a pixel position of the additional control object on the image;
    comparing the at least one estimated additional control direction to the at least one additional control direction determined based on the additional position data to obtain a direction disagreement vector;
    computing a correction rotation matrix to minimize the direction disagreement vector.

5. The method according to claim 3, wherein estimating the camera attitude using the at least one additional control direction comprises solving the equations provided by the camera model applied at the two control objects.

6. The method according to claim 1, wherein acquiring the image comprises:
    capturing a plurality of overlapping elementary images by modifying an orientation of the camera so as to scan a predetermined area of the scene, and
    forming a panoramic image by mosaicing of the elementary images.

7. The method according to claim 6, wherein the control object and the target belong to different elementary images.

8. The method according to claim 6, wherein the image further includes at least one additional control object and the method further comprises:
    obtaining additional position data regarding the at least one additional control object using the geo-spatial positioning system;
    determining at least one additional control direction from the camera to the at least one additional control object in the ground referential using said additional position data;
    and wherein:
    estimating the camera attitude is performed using the at least one additional control direction, and
    the at least one additional control object and the control object belong to different elementary images.

9. The method according to claim 1, wherein the ground referential is a East, North, Up referential centered on the camera position.

10. The method according claim 1, wherein the geo-spatial positioning system is a Global Navigation Satellite System (GNSS).

11. The method according to claim 10, wherein the position data are provided without using differential correction and/or without using real time kinematic procedures.

12. A surveying module for determining a direction of a target in a ground referential, the surveying module comprising:
    an image input unit configured for receiving an image of a scene including the target and a control object, the image being acquired using a camera;
    a position data input unit configured for receiving position data of the camera and of the control object from a geo-spatial positioning system; and
    a target direction processing unit configured for:
        determining a control direction from the camera to the control object in the ground referential using said position data;
        estimating a camera attitude in the ground referential using the control direction; and
        determining the target direction from the camera to the target using the estimated camera attitude and a pixel position of the target in the image.

13. The surveying module according to claim 12, wherein the target direction processing unit is further configured for, when the image received by the image input unit further includes at least one additional control object and the position data received by the position data input unit further includes additional position data of the at least one additional control object:
    determining at least one additional control direction from the camera to the at least one additional control object in the ground referential using said additional position data;

and wherein estimating the camera attitude is performed using the at least one additional control direction.

14. A surveying system comprising:
   a camera including a geo-spatial position receiver configured for receiving position signals from a geo-spatial positioning system and a geo-spatial position processor for determining camera position data from said position signals; and
   a surveying module according to claim 12.

15. The surveying system of claim 14, further comprising a control object including a geo-spatial position receiver configured for receiving position signals of the control object from the geo-spatial positioning system and a communication unit configured for transferring said position signals to the geo-spatial position processor, the geo-spatial position processor being further configured for determining position data of the control object from said control object position signals.

* * * * *